(12) United States Patent
Wang

(10) Patent No.: US 7,987,779 B2
(45) Date of Patent: Aug. 2, 2011

(54) APPARATUS FOR PRINTING ON THE PLANT SURFACE AND THE ARTIFICIAL PLANT SURFACE

(76) Inventor: Hong Wang, Qingdao (CN)

(*) Notice: Subject to any disclaimer, the term of this patent is extended or adjusted under 35 U.S.C. 154(b) by 921 days.

(21) Appl. No.: 11/814,352

(22) PCT Filed: Jul. 14, 2005

(86) PCT No.: PCT/CN2005/001041
§ 371 (c)(1),
(2), (4) Date: Jul. 26, 2007

(87) PCT Pub. No.: WO2006/076836
PCT Pub. Date: Jul. 27, 2006

(65) Prior Publication Data
US 2008/0184900 A1    Aug. 7, 2008

(51) Int. Cl.
*B41F 17/00* (2006.01)
(52) U.S. Cl. .......................... 101/35; 101/41
(58) Field of Classification Search ............. 101/35, 101/41, 44; 347/4, 104, 108
See application file for complete search history.

(56) References Cited

U.S. PATENT DOCUMENTS

| | | | |
|---|---|---|---|
| 4,540,996 A * | 9/1985 | Saito | 347/43 |
| 5,664,255 A * | 9/1997 | Wen | 396/627 |
| 5,897,797 A * | 4/1999 | Drouillard et al. | 219/121.68 |
| 6,180,914 B1 * | 1/2001 | Jones et al. | 219/121.68 |
| 6,499,842 B1 * | 12/2002 | Kofman et al. | 347/105 |
| 6,741,089 B2 * | 5/2004 | Conroy | 324/755 |
| 2004/0031410 A1 | 2/2004 | Harris | |
| 2004/0239705 A1 * | 12/2004 | Arikita | 347/5 |

FOREIGN PATENT DOCUMENTS

| | | |
|---|---|---|
| CN | 1194611 | 9/1998 |
| CN | 2532978 | 1/2003 |
| CN | 1564748 | 1/2005 |
| CN | 2703651 | 6/2005 |
| JP | 2006289654 A * | 10/2006 |

* cited by examiner

*Primary Examiner* — Ren Yan
(74) *Attorney, Agent, or Firm* — Workman Nydegger

(57) ABSTRACT

An apparatus for printing on the plant surface and the artificial plant surface, comprises a housing. A gripping device for holding the plant or artificial plant and a printing unit for printing on its surfaces are disposed in said housing. Said printing unit is connected to a computer which is external or integrated in the housing. The printing unit of the present invention is an ink jetting unit, which can print on the plant surface and the artificial plant surface, especially flower, artificial flower, leaves and the fruit. People can communicate information using these articles, which satisfied the demand.

26 Claims, 8 Drawing Sheets

APPARATUS FOR PRINTING ON THE PLANT SURFACE AND THE ARTIFICIAL PLANT SURFACE

TECHNICAL FIELD

The present invention relates to a printer, in particular an apparatus for printing images on surfaces of plant or artificial plant.

BACKGROUND ART

In life, plant or artificial plant, such as flower, artificial flower, red leaf and fruit, are mutually presented among people in order to express sentiments. Accompanying with people's more and more intense desire of fashion seeking and showing individuality, people wish to provide self-defined images onto those articles to express personal thinking and sentiments.

Presently, printing is adopted as the way of providing images on plant surface or artificial plant surface. Although personal requirements can be met by this way, the printing possesses an insuperable deficiency, that's, the plate-making that is necessary to all kinds of printing is complicated in processing, time-wasting, and labor-wasting, which is a bottleneck that restricts development of the technology and prevents the technology from being popular and meeting the requirement of most people. For example, US patent application No. 20040031410 disclosed a method for printing image on flower by means of transfer printing. However, the method is too complicated in processing to be popularly and wildly utilized. Besides, the method is performed only by hand.

Thus it can be seen that it is not a good choice to provide images onto the plant surface and the artificial plant surface through printing.

Since printing and print are similar technologies, it is easily conceived to overcome the above deficiency by print. However, among the current types of prints, the applications of laser print and hot transfer print are limited because of the part high temperatures of the print heads and the pressures between the print heads and the mediums. They can not be used onto the delicate articles such as the above mentioned plant and artificial plant. On the contrary, ink jet print should be suitable. Actually, it was mentioned in the foregoing US patent application that ink jet print could be used for printing image on the flower, but only transfer print by hand without any corresponding apparatus.

However, limited by the shapes of the plant and the artificial plant, obviously traditional ink jet print can not be used, for they can not enter the paper path as paper sheets. That's, specific structure and circuit of print should be used to print images on the surfaces of those articles. However, an apparatus with specific structure, which can be used to directly print image on the surfaces of plant and artificial plant, does not come into people's eyes.

SUMMARY OF THE INVENTION

An object of the present invention is to provide an apparatus for printing clear, beautiful, flamboyant and elective image on surfaces of plant and artificial plant so that the plant may transfer more earnest and rich emotion and make more romantic feeling.

The present invention comprises: a housing, a gripping device disposed in the housing for gripping the plant or artificial plant, a printing unit for printing on the surfaces of plant or artificial plant, a computer device outside connected with or integrated in the housing and connecting the printing unit.

The printing unit comprises a printing bracket moving longitudinally relative to the gripping device; a printing head is provided on the printing bracket for moving widthwise relative to the printing bracket. One of the gripping device and the printing bracket is fixed on the housing; the other of them is connected with a bracket drive device connected with a computer device. For example, the gripping device is fixed on the housing, and the bracket drive device comprises a motor disposed on the housing; a sliding slot is provided on the printing bracket; the motor drives the printing bracket through a transmission device to slide longitudinally relative to the housing. The transmission device may be any one of the following structures:

1. The transmission device comprises two belt pulleys which are provided on the housing and connected with each other through a belt which is fixed with the printing bracket on a position thereof. The belt is a toothed belt, and the belt pulley is a belt pulley with teeth.
2. The transmission device is gear-rack mechanism which comprises a gear driven by the motor and a rack disposed on the printing bracket, so that the motor drives the printing bracket through the gear-rack mechanism to slide longitudinally relative to the housing.
3. The transmission device is screw-nut mechanism which comprises a screw disposed longitudinally on the housing and rotated under the drive of the motor, and a corresponding nut fixed on the printing bracket, so that the motor drives the printing bracket to slide longitudinally relative to the housing through the screw-nut mechanism.
4. The transmission device is crank-slider mechanism which comprises a sliding slot provided on the housing, a corresponding slider provided or formed on the bottom of the printing bracket, and a crank driven by the motor, provided on the housing and connected with the printing bracket through a link rod, so that the motor drives the printing bracket to slide longitudinally relative to the housing through the crank-slider mechanism.

The motor is connected with the transmission device through a speed reducer mechanism. Furthermore, a camera is disposed in the housing so as to provide accurate position of an article to be printed and print preview of the article to the computer device. The gripping device is disposed on the front part of the housing and comprises a supporting bracket, and a top cover hinged to the supporting bracket and having an opening for printing. A holding bracket is disposed at the middle portion of the supporting bracket; and the height of the holding bracket is adjustable. Money identifying and returning device is disposed in the housing and is connected with the computer device so as to identify the money provided by the user and return the change to the user.

The computer device is integrated in the housing. A connecting interface for movable memorizer is disposed on the housing and is connected with the computer device so as to connect and read the movable memorizer provided by the user. The connecting interface for movable memorizer is a USB interface, IEEE1394 interface, IrDA infrared interface or RS-232/485 Serial Bus interface; and the movable memorizer is CF card, SM card, memory rod, movable hard disk, U-disk, CD-ROM, ZIP driver or any other movable data read and memory device.

The computer device comprises a display module, memory module, input module, and printing module; wherein, a control unit is arranged to be connected with said modules through a bus.

The control unit at least comprises a programmable logic-controlled integrated circuit and a peripheral matchable circuit;

The memory module at least comprises an external memorizer and a connecting interface for the external memorizer;

The input module is a touch screen or a set of panel micro switches.

The programmable logic-controlled integrated circuit is a MCU single-chip microcomputer or a CPLD/EPGA complex programmable logic device. I/O ports of the programmable logic-controlled integrated circuit are connected with the corresponding ports of the display module, memory module, input module, communication module, account module and printing module through the bus. The programmable logic-controlled integrated circuit is connected with a communication module, account module and/or extended interfaces through the bus.

The display module is a liquid crystal display. The communication module is a wired network card, a wireless network card, or a modem. The account module includes coin machine and control circuit thereof.

The printing unit is an ink jet printer. The apparatus of the present invention may be used to print images on surfaces of flower, artificial flower, leaf or fruit.

The advantageous and beneficial effects of the present invention are as follows:
1. It can be used to print color images directly on surfaces of plant and artificial plant.
2. The image may be updated on-line or self-defined according to the fashion at any moment.
3. The operation is controlled in program through a micro camera such that the printing effect can be reviewed, the image can be zoomed and rotated. The printing procedure is display in real time and can be effectively controlled.
4. The printing process may be finished in seconds.

DETAILED DESCRIPTION OF THE PREFERRED EMBODIMENTS

Embodiment 1

Figure 1:
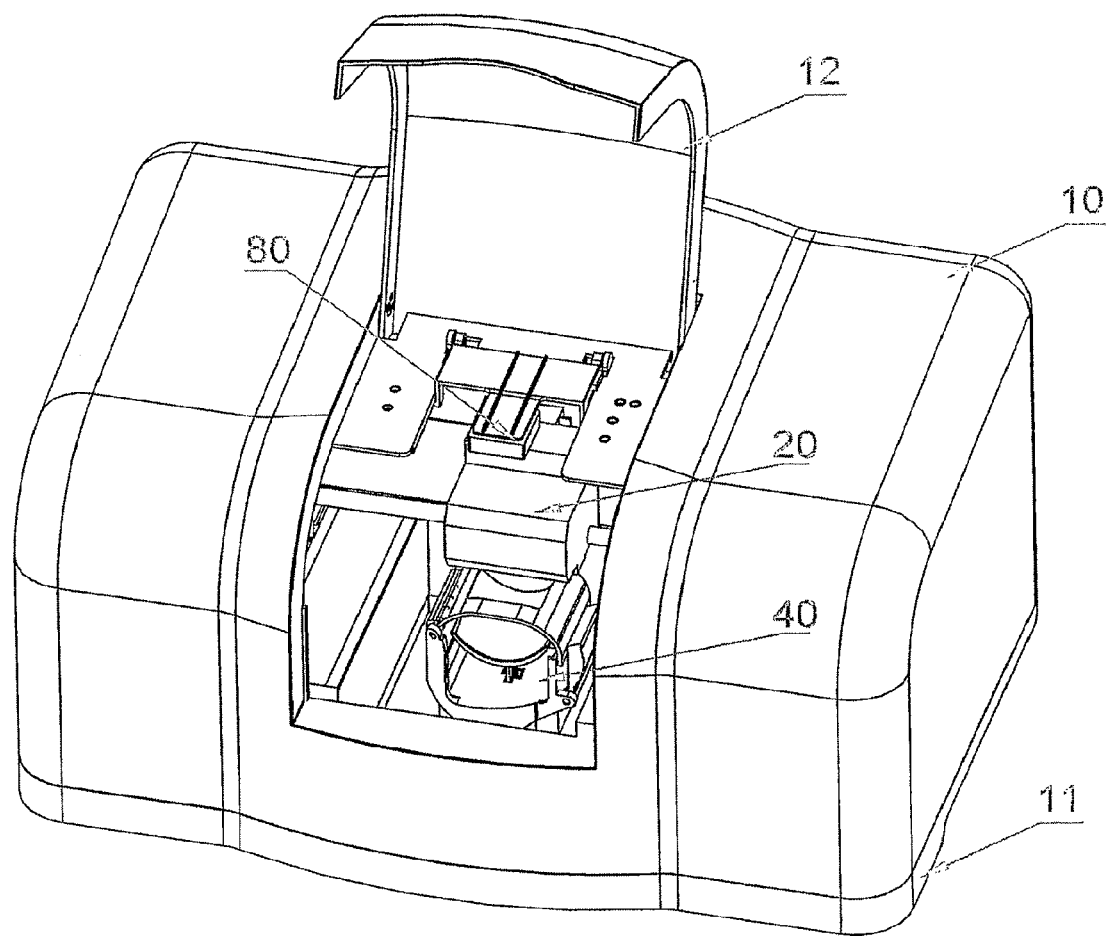
FIG. 1 is a schematic view showing whole structure of a first embodiment.
Figure 2:
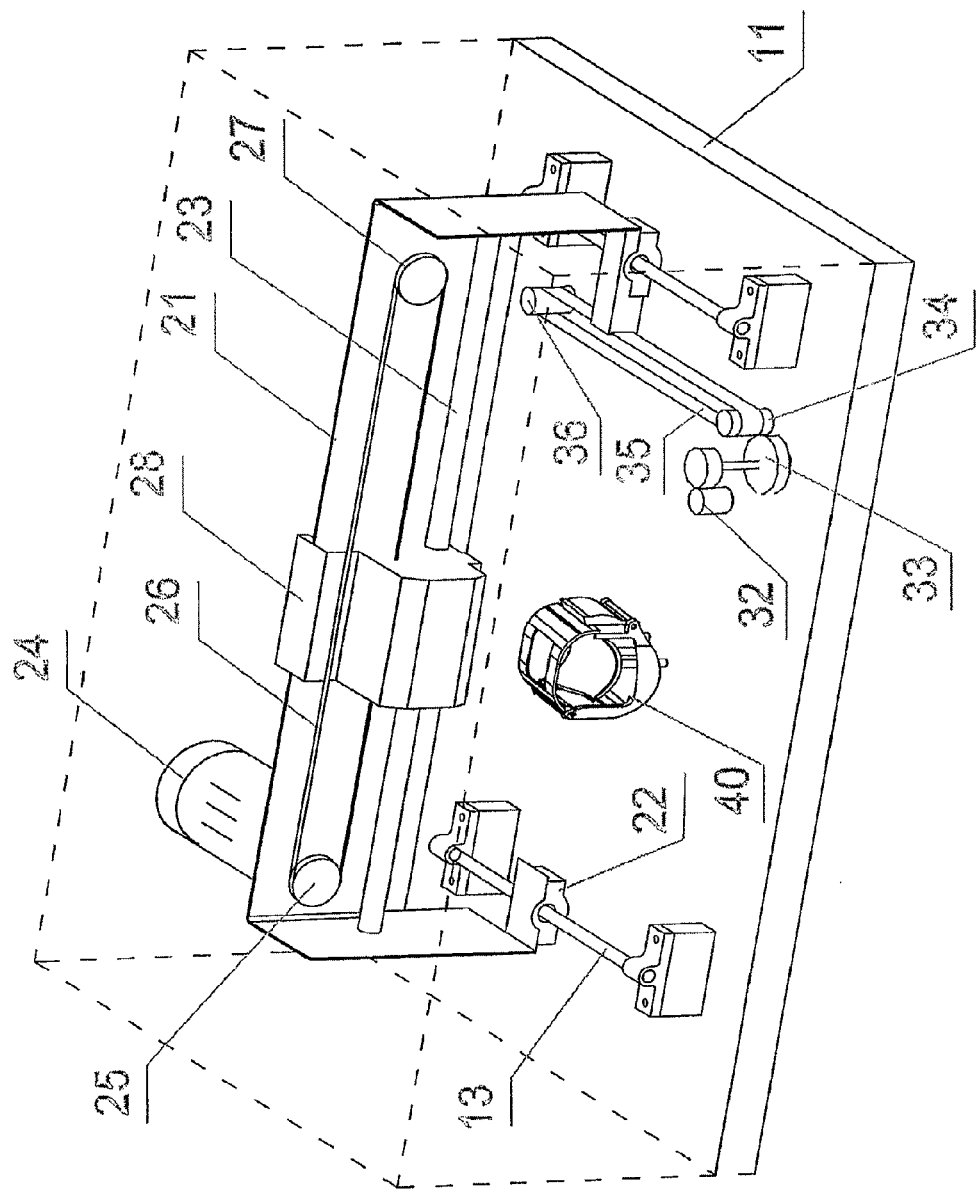
FIG. 2 is a schematic view showing inner structure of the first embodiment shown in FIG. 1.

The embodiment is for printing on the flower and the artificial flower. As shown in FIG. 1, it comprises a housing 10 which are comprised of a base 11 and a cover 12 hinged to the base 11. Two horizontal guiding posts 13 parallel to each other are longitudinally fixed on the base 11, and two corresponding guiding sleeves 22 are disposed on the bottom of the printing bracket 21. A bracket motor 32 is fixed on the base 11. The bracket motor 32 is associated with an active belt pulley 34 with gear teeth through a gear reducer 33, and the active belt pulley 34 is associated with a driven belt pulley 36 through toothed belt 35 which is fixed on a position of the base 11. The active belt pulley 34, the belt 35 and the driven belt pulley 36 constitute a transmission mechanism 30. Through the gear reducer 33 and the transmission mechanism 30, the rotation of shaft of the bracket motor 32 drives the printing bracket 21 to slide along the guiding post 13, as shown in FIG. 2.

A traverse guiding post 23 and a printing head motor 24 are horizontally disposed on the printing bracket 21. A gear 25 is disposed on one end of main shaft of the printing head motor 24 and is coupled to a driven gear 27 through a belt 26 which is fixed with a printing head 28 on one position. The printing head 28 sleeves the guiding post 23 so as to form a sliding cooperation, as shown in FIG. 2. Through the belt 26, the printing head motor 24 drives the printing head 28 to slide along the guiding post 23. The printing bracket 21 and the elements disposed thereon constitute a printing unit 20.

Figure 3:
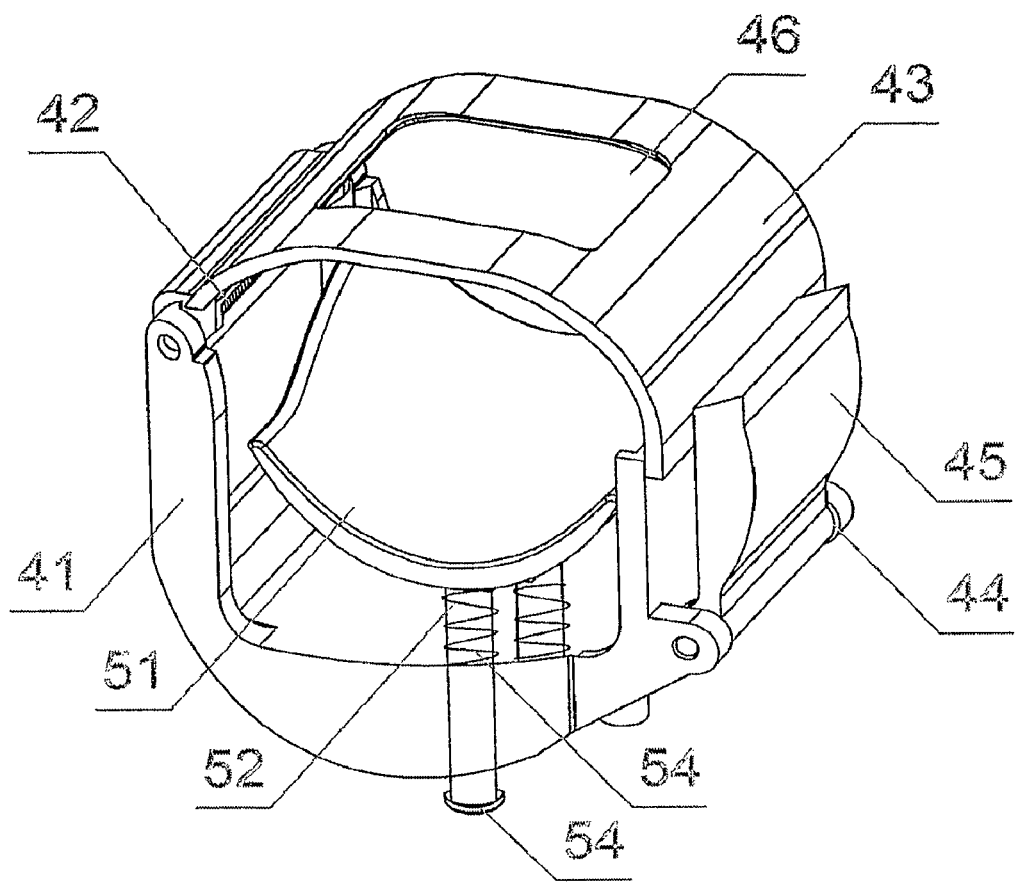
FIG. 3 is a schematic view showing structure of a gripping device of the first embodiment.
Figure 4:
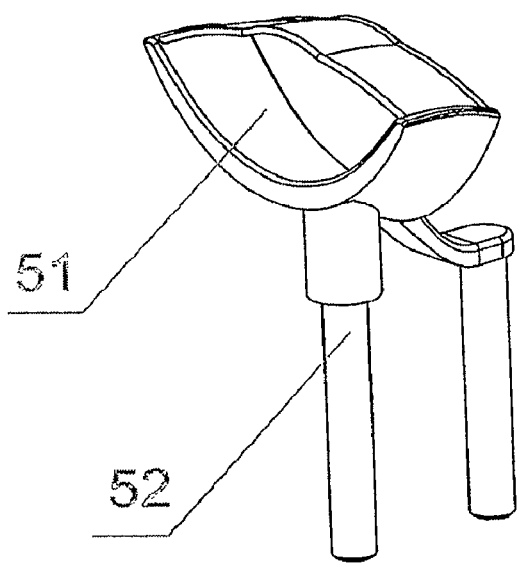
FIG. 4 is a schematic view showing structure of another holding bracket.

A gripping device 40 for gripping flower is disposed on the base 11. As shown in FIG. 3, the gripping device 40 comprises a "U"-shaped supporting bracket 41, to one side of which a top cover 43 is hinged through a first torsion spring 42. The opening 46 on the center of the top surface of the top cover 43 forms a "dormer". A locking hook 45 is hinged to the other side of the supporting bracket 41 through a second torsion spring 44. A free end of the top cover 43 is tapered so as to constitute an impact lock mechanism together with the locking hook 45. The first torsion spring 42 acts on the top cover 43 such that the top cover 43 tends to be opened, and the second torsion spring 44 acts on the locking hook 45 such that the locking hook 45 tends to be attached to the right side of the supporting bracket 41. A holding bracket 51 is disposed on the bottom of the supporting bracket 41, wherein, the lower part of the holding bracket 51 forms a slim rod 52, the lower end of which passes through a corresponding through hole 53 on the bottom of the supporting bracket 41. The through hole 53 has a diameter slightly larger than that of the slim rod 52. The end of the slim rod 52 passed through the through hole 53 is provided with a stop ring 54 so as to prevent the slim rod 52 from escaping from the through hole 53. The part of the slim rod 52 between the holding bracket 51 and the supporting bracket 41 is sleeved with a spring 55.

The specific shape of the holding bracket 51 can be designed depending on the shape of the flower. The holding bracket 51 in FIG. 3 is suitable for flowers such as rose, tulip and peony. The holding bracket 51 in FIG. 3 is also suitable for lily and anthurium.

In practice, the lower part of the holding bracket 51 can be connected to the base 11 through adjustable blot, which is in the protection scope of the present patent application.

A camera 80 connected with a computer through data lines is disposed immediately above the gripping device 40 of the housing 10.

In use, it is supposed that the top cover is closed at the initial state. At this time, the locking hook 45 tightly hooks the top cover 43 due to the act of the second torsion spring 44. If the top cover 43 is required to be opened, it is just required that the locking hook 45 is softly turned by hand. In this way, the free end of the top cover 43 escapes from the locking hook 45 and automatically opens due to the act of the first torsion spring 42. When the hand is removed from the locking hook 45, the locking hook 45 restores. A flower is positioned on the holding bracket 51, and then the top cover 43 is closed by hand. When the free end of the cover top 43 touches the locking hook 45, the impact lock mechanism automatically locks. In this way, the flower is gripped between the top cover 43 and the holding bracket 51 and the holding bracket 51 is pressed downward for a distance. Due to the act of the spring 55, the flower is gripped appropriately but not too tight to be damaged. Then, through a computer, the printing motor 32 is controlled to drive the printing bracket 21 to slide onto immediately above the flower, the display of the out computer displays stored images such that the user can select one or more images through the input device of the computer, then the selected images are oriented and adjusted; the computer controls the camera 80 to capture the video of the flower in the current position and shows the printing effect with the video and the selected image. In this state, the system receives an adjustment instruction from the user to adjust the position, dimension, posture and the color of the image, and decide whether to overlap the image to the template stored in its memory so as to add the image with specific lace and special effect or not according to the determination of the user. During this procedure, the arithmetic is pre-designed through the program by the system to ensure the effect obtained through overlapping the image to the video consistent with that of the finished flower. The adjustment is finished until the user is satisfied with the effect, at this time, the system processes the data of the video, the data of the selected images, the adjustment data and the printing data and transmits the processed results into the printing system; the printing system prints the images designed by the user onto the flower and stores the information of the images and the time at the system memory device. During the printing, the bracket motor 32 drives the printing bracket 21 to move horizontally and longitudinally, and the printing head motor 24 drives the printing head 28 to move along the guiding post 23 horizontally and widthwise, so as to print the images.

The computer device 70 of the embodiment may be any computer currently available if only it is provided with the corresponding control program, which is in the protection scope of the present patent application.

Embodiment 2

Figure 5:
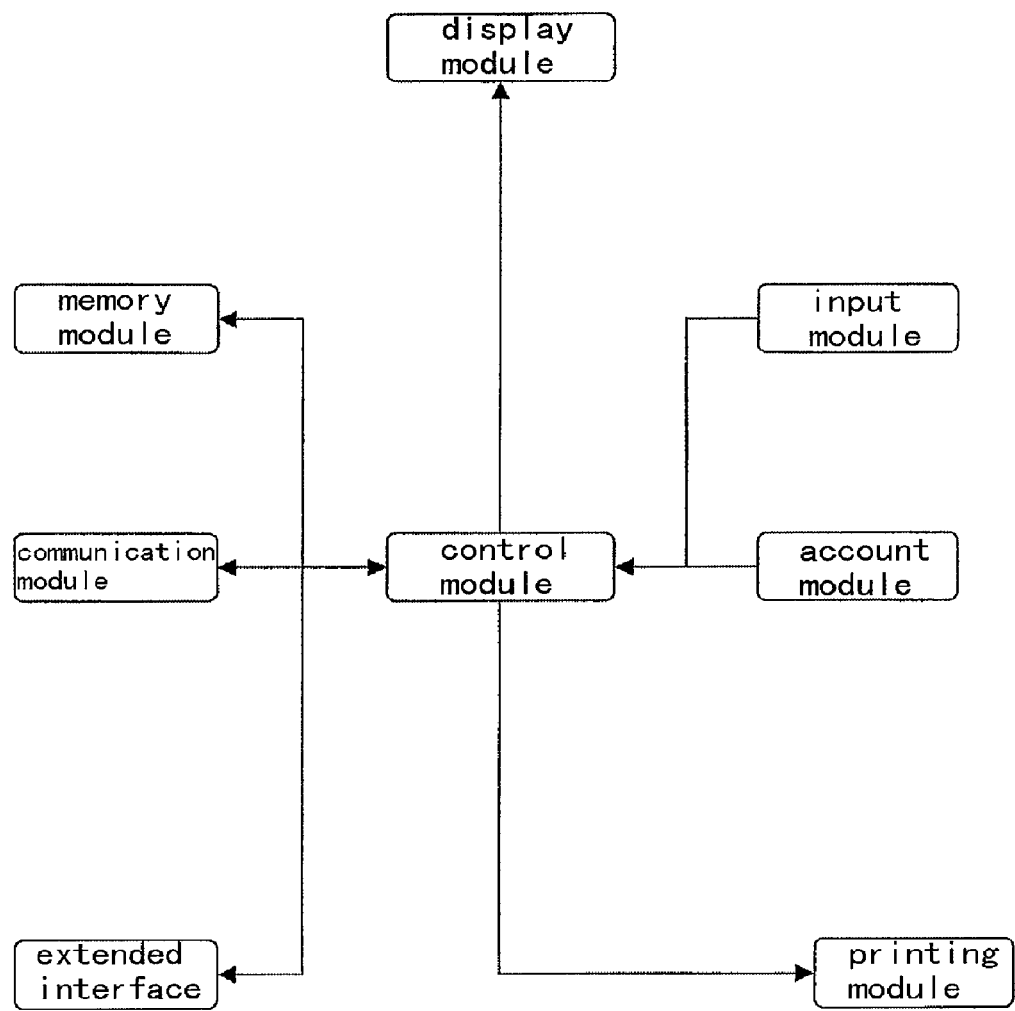
FIG. 5 is a block diagram of the computer of the second embodiment.

Compared with the embodiment 1, the computer device 70 of embodiment 2 is integrated in the housing 10. Display device and input device are mounted on the surface of the housing 10. The circuit diagram is as shown in FIG. 5. Display module, memory module, input module, communication module, account module and printing module are connected to the control unit through a bus. The control unit is comprised of at least a programmable logic-controlled integrated circuit and a peripheral matchable circuit. I/O ports of the programmable logic-controlled integrated circuit are connected with the corresponding ports of the display module, memory module, input module, communication module, account module and printing module through the bus. The memory module is comprised of at least an external memorizer and an external connecting interface for the external memorizer. The input module is a touch screen or a set of panel micro switches. The programmable logic-controlled integrated circuit is connected with extended interfaces through the bus.

Wherein, the programmable logic-controlled integrated circuit is a single-chip microcomputer such as Microcomputer Unit (MCU), or a complex programmable logic device such as Complex Programmable Logic device (CPLD), or Field Programmable Gate Array (EPGA).

The display module is a liquid crystal display.

The connecting interface for the external memorizer may be a USB interface, IEEE1394 interface, IrDA infrared interface or RS-232/485 Serial Bus interface. The external memorizer may be CF card, SM card, memory rod, movable hard disk, U-disk, CD-ROM, ZIP driver or any other movable data read/write and memory device.

The communication module may be a wired network card, a wireless network card, or a modem.

The account module includes coin machine and the control circuit thereof

Figure 6:
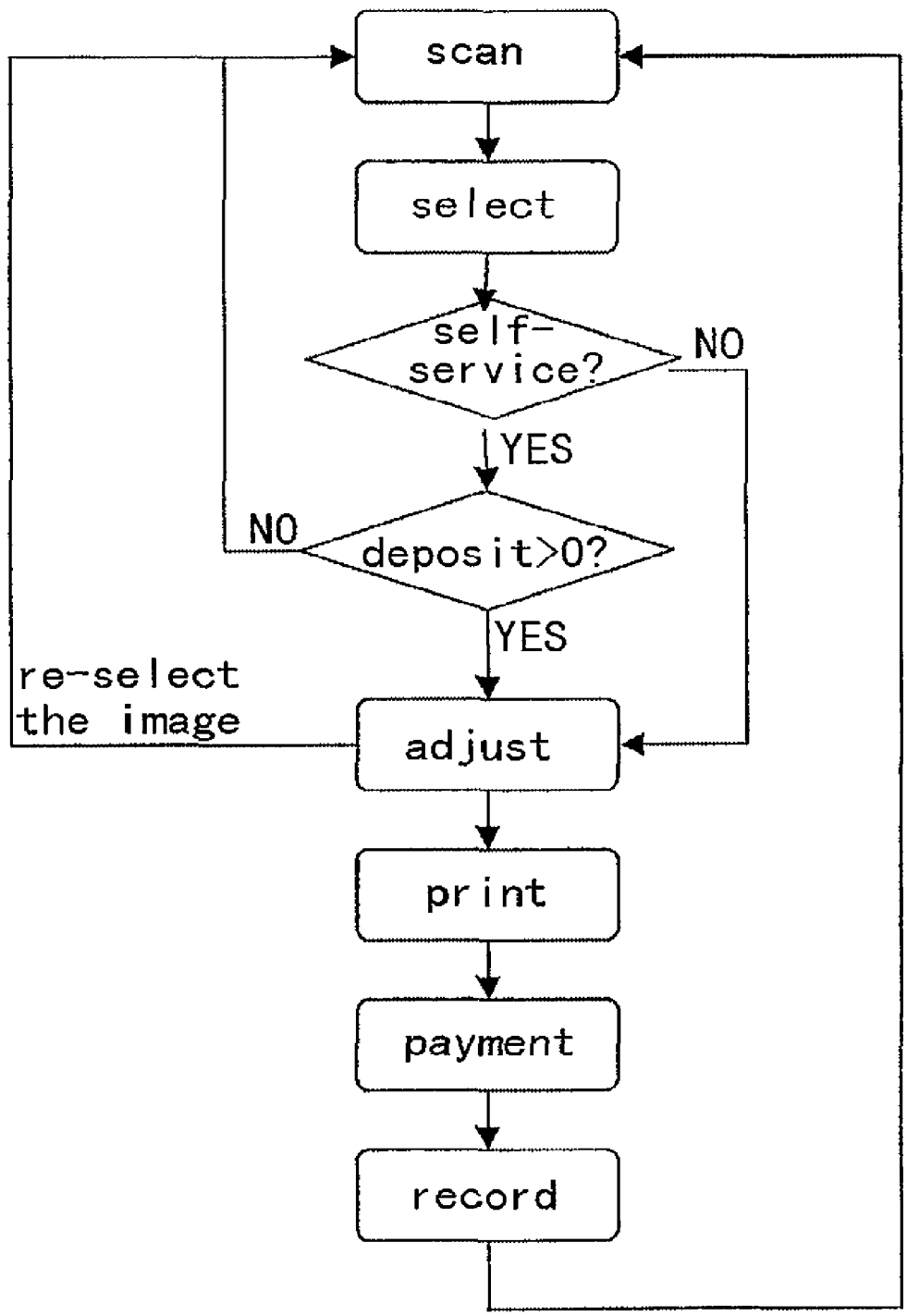
FIG. 6 is a flow chart of the operation of the second embodiment.

In FIG. 6, the control unit functions to maintain the smooth operation of the whole system, receive the information input from the other module and the outside, and differently respond to the different information.

Due to the arrangement of the connecting interface for the external memorizer, if the user dissatisfies with the pre-defined images or desires to design special images himself, he may insert an external memory device. The system may automatically detect the device and display the effective image files in the external memory device for the user's selection after zooming them in a proportion.

The system may be connected with a money identifying and return system such that the whole system can achieve a self-service function. The account module receives the signal transmitted by the coin machine, and accounts the fees as the instruction sent by the program of the single-chip microcomputer. The system may identify the true and false, and the par value of the money inserted, and then transmits the data to the control unit where the value of the money and the time are recorded. When the user requests the change, the system calculates the money paid by the user and the change of the consume based on the management mode of the system, and then returns the change to the user through the money return system, and at the same time records the information of the amount of change and the dealing time.

Figure 7:
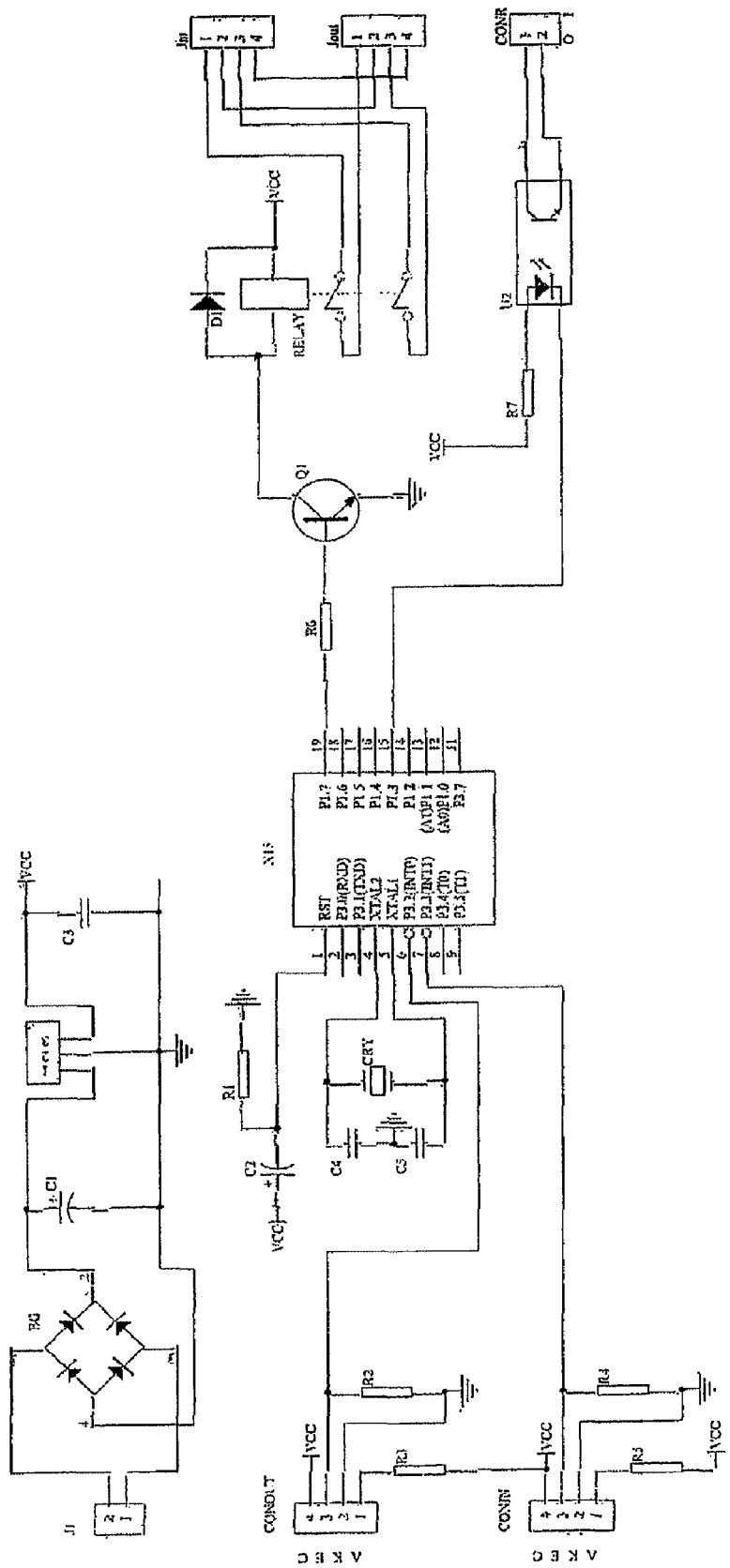
FIG. 7 is a circuit diagram of the second embodiment.

In FIG. 7, the I/O ports of the programmable logic-controlled integrated circuit X15, i.e., INT1, INT0 are correspondingly connected with I/O ports of the other modules through pins CONIN, CONOUT, the P1.3 pin of the programmable logic-controlled integrated circuit X15 are correspondingly connected with ports of the other modules through isolating circuit U2 and pin CONR, and the P1.7 pin of the programmable logic-controlled integrated circuit X15 are correspondingly connected with pins JIN, JOUT through drive circuit Q1 and a relay, so as to control the operation state of the printing module.

Since the functions of the interfaces of the single-chip microcomputer may be defined by programs, the detailed connection relationship among the circuit of the embodiment is to schematically explain the invention. The person skilled in the art may design a circuit with same function but different connection relationship. The detailed is omitted herewith for concise.

Since the connection between the single-chip microcomputer and the liquid crystal display, the touch screen, the panel micro switch, the connecting interface for external memorizer, the wired network card, the wireless network card, the modem, the control circuit of the printer and the control circuit of the coin machine through bus (data bus, control bus, and/or address bus) are prior art, so the detailed is omitted herewith for concise.

If the chip of the single-chip microcomputer is chosen as the integrated circuit X15, the chip may be selected from the PIC16C61 of PIC series of Microchip company, AT89C2051 series of Atmel company and 89 series of Philips. If the circuit chip of CPLD or EPGA is chosen, the 9536 chip of CPLD series of Xilinx company, the chip of Flex series of Altera company, or the chip of Atmel company with same function may be adopted.

Since the programmable logic-controlled integrated circuit i.e., the single-chip microcomputer is adopted to achieve all kinds of control functions required for the printing, the whole bulk of the printer, the rate of fault are reduced, moreover, the cost of manufacture and the selling price of the whole apparatus, the management cost of the merchant and the expenditure of the consumer are all significantly reduced, while all the functions of the conventional apparatus are achieved. The desk-lization and micromation of the apparatus is achieved. It also creates new market and conveniences the upgrade and update of the apparatus.

In the embodiment, the transmission mechanism for driving the printing bracket to move is different from that of embodiment 1. It is comprised of a gear driven by the motor and a rack disposed on the printing bracket. The gear and the rack constitute a gear-rack mechanism. Through the gear-rack mechanism, the motor drives the printing bracket to longitudinally slide relative to the housing. Other portions of embodiment 2 are the same as those of embodiment 1

Embodiment 3

Figure 8:
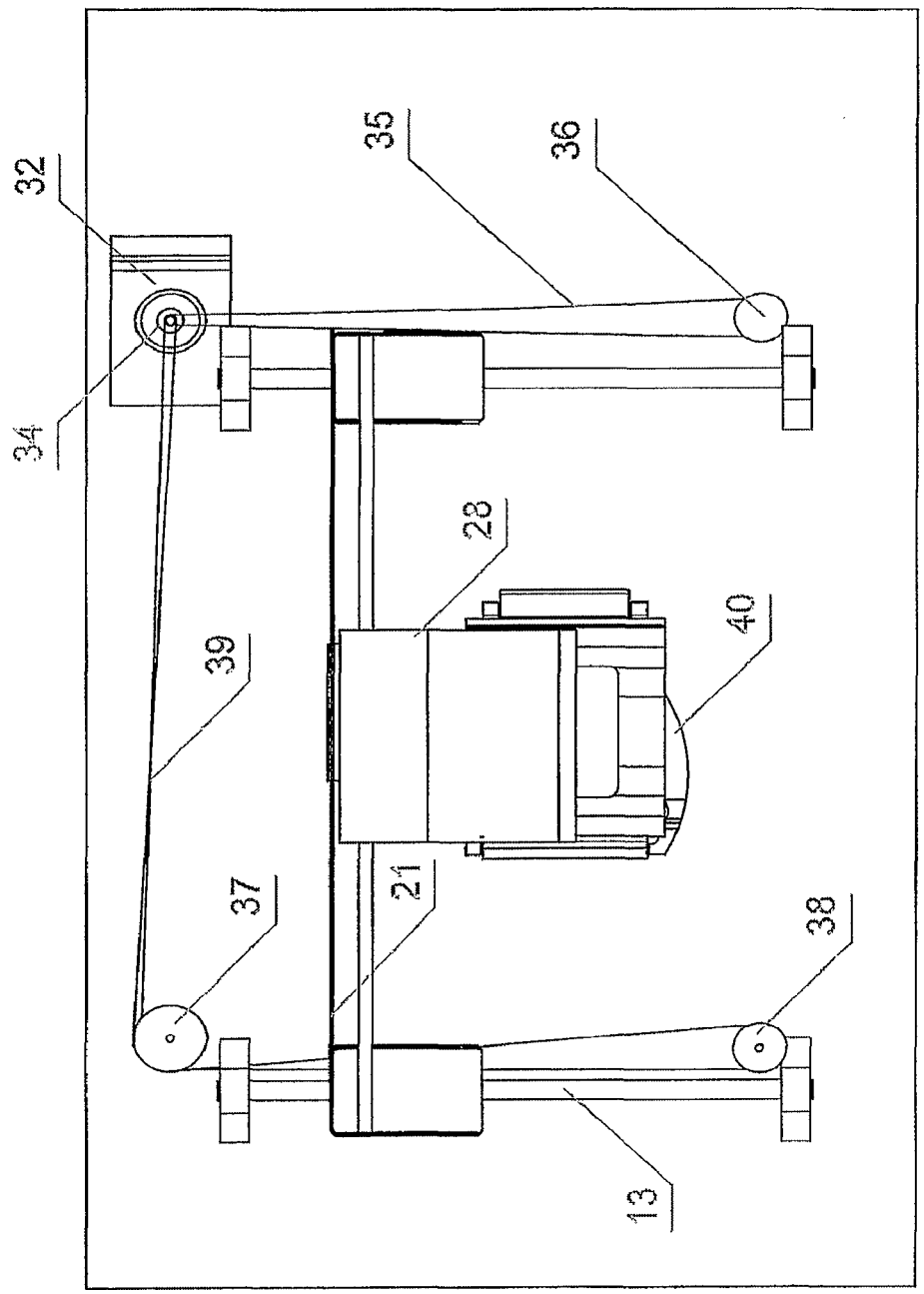
FIG. 8 is a top view of a third embodiment.

As shown in FIG. 8, compared with the embodiment 1, the transmission mechanism is comprised of a bracket motor 32 fixed on the base 11. The bracket motor 32 is coupled to an active belt pulley 34, and the active belt pulley 34 is coupled to a driven belt pulley 36 through a belt 35 which is fixed at the bottom of the left end of the printing bracket 21 on a position thereof. At the same time, an aid belt pulley 37 and a second driven belt pulley 38 are disposed on the other end of the printing bracket 21. The active belt pulley 34 is coupled to the second driven belt pulley 38 through a second belt 39 which surrounds the aid belt pulley 37. The part of the second belt 39 between the aid belt pulley 37 and the second driven belt pulley 38 is parallel to the guiding post 13 and is fixed with one end of the printing bracket 21 on a corresponding position thereof. In use, the bracket motor 32 rotates, so that the active belt pulley 34 drives the two ends of the printing bracket 21 to slide along the gilding post 13 through the two belts. Compared with embodiment 1, the two ends of the printing bracket 21 are acted by force at the same time, so the balance property is better.

Figure 9:
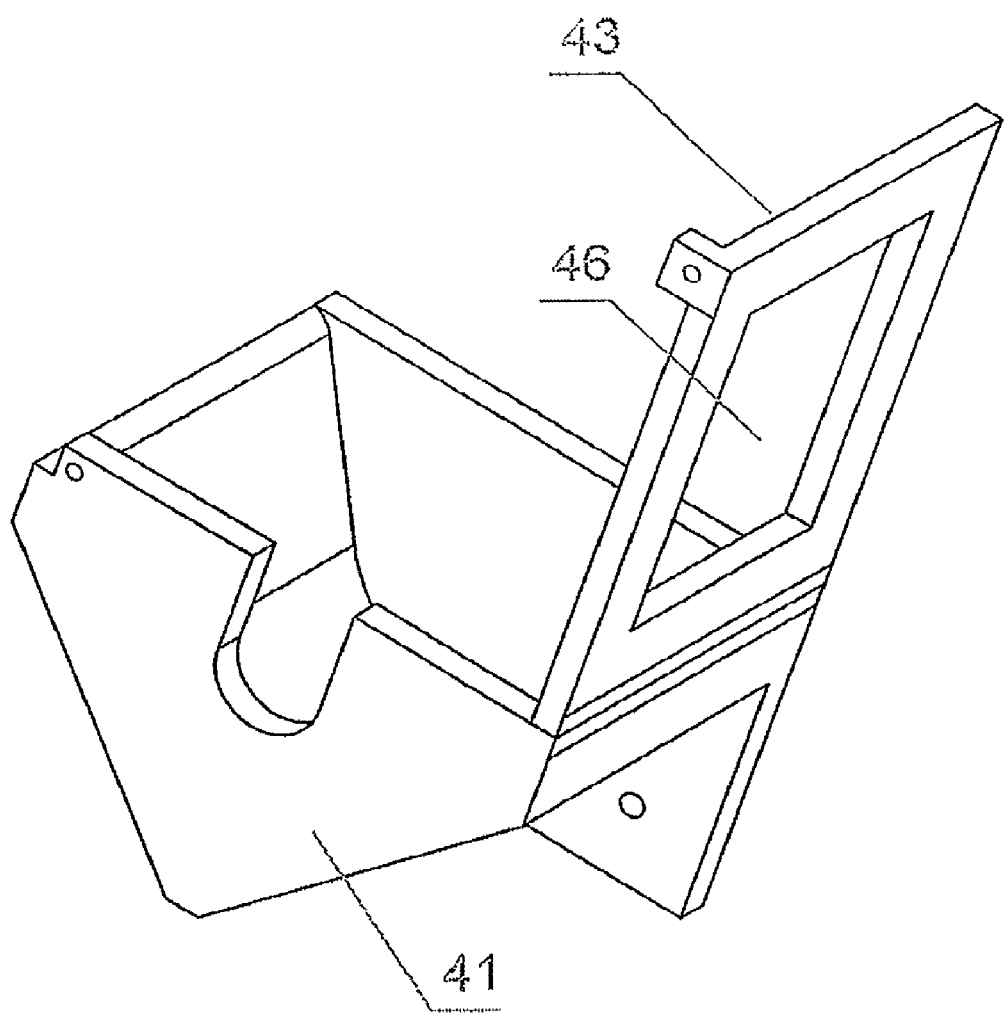
FIG. 9 is a schematic view showing the structure of the holding bracket of the third embodiment.

The gripping device of the embodiment as shown in FIG. 9 is comprised of a "V"-shaped supporting bracket 41, on one side of which a top cover 43 is hinged.

An opening 46 is provided on the center of the top surface of the top cover 43 so as to form a "dormer". A locking structure such as a pin is adopted to lock the top cover 43 after it is closed. A cavity for receiving flower is provided on the top surface of the supporting bracket 41, and a slot for receiving a scape of the flower is provided with on the front surface of the supporting bracket and the cavity. The supporting bracket 41 is provided with a mounting hole on the lower part thereof for being mounted on the housing. In use, the flower is disposed in the cavity and the scape is gripped in the slot so that the flower is kept stable, then the top cover 43 is closed and the flower is printed through the opening 46.

The gripping device can be driven to slide horizontally and longitudinal along the housing. In this way, the gripping device can be pulled out, and then pushed in after the flower is disposed into it. When the printing is finished, the gripping device may be pulled out to remove the flower. Such a mechanism is prior art, so the detailed description is omitted. However, such a mechanism is in the protection scope of the present patent application.

The above mentioned embodiments disclose two optimal structures of the transmission mechanism. Actually, any other current structure that can be used falls in the protection scope of the present patent application, such as the three transmission mechanisms as follows: 1. The transmission mechanism is comprised of a screw disposed on the housing and rotated under the drive of the motor, and a corresponding nut fixed on the printing bracket. The screw and the nut constitute a screw-nut mechanism. Through the screw-nut mechanism, the motor drives the printing bracket to longitudinally slide relative to the housing. 2. A sliding slot is provided on the housing, a corresponding slider is provided or formed on the bottom of the printing bracket, and a crank driven by the motor is provided on the housing. The crank is connected with the printing bracket through a link rod so as to constitute a crank-slider mechanism. Through the crank-slider mechanism, the motor drives the printing bracket to longitudinally slide relative to the housing.

In the above embodiments, the gripping device is fixed on the housing, and the printing bracket slides relative to the housing. In practice, the arrangement may be contrary to the above, that's, the printing bracket is fixed on the housing, and the gripping slides relative to the housing. Therefore, one of the gripping device and the printing bracket is fixed on the housing, and the other of them is connected with a drive device connected with the computer. These are all in the protection scope of the present patent application.

Although flower is used for the explanation of the above embodiments, the article to be printed is not limited to the flower. The shape of the holding bracket can be designed as desire only if it suits to the article to be printed. In practice, the gripping device and/or the holding bracket therein can be designed as detachable such that they can be changed for printing different articles.

It can be seen from the above, the present invention can be used for printing images (patterns or characters) on surfaces of plant and artificial plant, especially flower, artificial flower, leaf, fruit. In this way, the emotion can be transferred and the requirements can be met through those articles.

As above, the description has been given for the preferred embodiments of the present invention. However, the present invention is not limited to the above description. Those skilled in the art can surely make various modification and changes thereto based on the purport of the present invention described in the appended claims or disclosed herein. Such modifications and changes are surely included in the scope.

What is claimed is:

1. An apparatus for printing images on surfaces of plant or artificial plant, comprising:
    a housing,
    a gripping device disposed in the housing for gripping the plant or artificial plant, the gripping device comprising a supporting bracket, a top cover hinged to the supporting bracket and having an opening for printing,
    a printing unit for printing images on the surfaces of plant or artificial plant,
    a computer device outside connected with or integrated in the housing and connecting the printing unit.

2. The apparatus for printing images on surfaces of plant or artificial plant as claim 1, wherein the printing unit comprises a printing bracket moving, longitudinally relative to the gripping device; a printing head is provided on the printing bracket so as to move widthwise relative to the printing bracket.

3. The apparatus for printing images on surfaces of plant or artificial plant as claim 2, wherein the gripping device is fixed on the housing; a bracket drive device is disposed on the housing and is connected with the computer device so as to drive the printing bracket to move longitudinally relative to the gripping device.

4. The apparatus for printing images on surfaces of plant or artificial plant as claim 3, wherein, the bracket drive device comprises a motor disposed on the housing; a sliding slot is provided on the printing bracket; the motor drives the printing bracket through a transmission device to slide longitudinally relative to the housing; the gripping device is fixed on the housing.

5. The apparatus for printing images on surfaces of plant or artificial plant as claim 4, wherein, the transmission device comprises an active belt pulley and a driven belt pulley provided on the housing, the active belt pulley and the driven belt pulley are associated with each other through a belt which is fixed with the printing bracket on a position thereof.

6. The apparatus for printing images on surfaces of plant or artificial plant as claim 5, wherein, an aid belt pulley and a second driven belt pulley is provided on the other end of the printing bracket; the active belt pulley is associated with the second driven belt pulley through a second belt which surrounds the aid belt pulley; a part of the second belt between the aid belt pulley and the second driven belt pulley is parallel to a guiding post and is fixed with the end of the printing bracket on a position thereof.

7. The apparatus for printing images on surfaces of plant or artificial plant as claim 4, wherein, the transmission device is of gear-rack mechanism which comprises a gear driven by the motor and a rack disposed on the printing bracket, so that the motor drives the printing bracket through the gear-rack mechanism to slide longitudinally relative to the housing.

8. The apparatus for printing images on surfaces of plant or artificial plant as claim 4, wherein, the transmission device is of screw-nut mechanism which comprises a screw disposed longitudinally on the housing and rotated under the drive of the motor, and a corresponding nut fixed on the printing bracket, so that the motor drives the printing bracket to slide longitudinally relative to the housing through the screw-nut mechanism.

9. The apparatus for printing images on surfaces of plant or artificial plant as claim 4, wherein, the transmission device is of crank-slider mechanism which comprises a sliding slot provided on the housing, a corresponding slider provided or formed on the bottom of the printing bracket, and a crank driven by the motor, provided on the housing and is connected with the printing bracket through a link rod, so that the motor drives the printing bracket to slide longitudinally relative to the housing through the crank-slider mechanism.

10. The apparatus for printing images on surfaces of plant or artificial plant as claim 4, wherein, the motor is connected with the transmission device through a speed reducer mechanism.

11. The apparatus for printing images on surfaces of plant or artificial plant as claim 5, wherein, the belt is a toothed belt, and the active belt pulley and the driven belt pulley are belt pulleys with teeth.

12. The apparatus for printing images on surfaces of plant or artificial plant as claim 2, wherein, a camera is disposed in the housing so as to provide accurate position of an article to be printed and print preview of the article to the computer device.

13. The apparatus for printing images on surfaces of plant or artificial plant as claim 1, wherein, a holding bracket is disposed at the middle portion of the supporting bracket; and the height of the holding bracket is adjustable.

14. The apparatus for printing images on surfaces of plant or artificial plant as claim 13, wherein, the supporting bracket is "U"-shaped; the top cover is hinged to one side of the supporting bracket through a first torsion spring; the opening is provided on the center of top surface of the top cover; a locking hook is hinged to the other side of the supporting bracket through a second torsion spring; a free end of the top cover has a predetermined pitch and constitutes an impact lock mechanism together with the locking hook; the first torsion spring is arranged to provide the top cover with a tendency of opening; the second torsion spring is arranged to provide the locking hook with a tendency of attaching to the right side of the supporting bracket; the holding bracket is disposed on the bottom of the supporting bracket; the lower part of the holding bracket forms a slim rod; the lower end of the slim rod passes through a corresponding through hole on the bottom of the supporting bracket; the through hole has a diameter slightly larger than that of the slim rod; the end of the slim rod passed through the through hole is provided with a stop ring; a part of the slim rod between the holding bracket and bottom of the supporting bracket is sleeved with a spring.

15. The apparatus for printing images on surfaces of plant or artificial plant as claim 1, wherein, the computer device is integrated in the housing and comprises a display module, memory module, input module, and printing module; wherein, a control unit is further arranged to be connected with said modules through a bus; wherein, the control unit at least comprises a programmable logic-controlled integrated circuit and a peripheral matchable circuit; the memory module at least comprises an external memorizer and a connecting interface suitable for the external memorizer; the input module is a touch screen or a set of panel micro switches.

16. The apparatus for printing images on surfaces of plant or artificial plant as claim 15, wherein, the programmable logic-controlled integrated circuit is a MCU single-chip microcomputer or a CPLD/FPGA complex programmable logic device.

17. The apparatus for printing images on surfaces of plant or artificial plant as claim 15, wherein, I/O ports of the programmable logic-controlled integrated circuit are connected with the corresponding ports of the display module, the memory module, the input module, communication module, account module and the printing module through the bus.

18. The apparatus for printing images on surfaces of plant or artificial plant as claim 17, wherein, the account module includes coin machine and control circuit thereof.

19. The apparatus for printing images on surfaces of plant or artificial plant as claim 15, wherein, the programmable logic-controlled integrated circuit is connected with communication module, account module and/or extended interfaces through the bus.

20. The apparatus for printing images on surfaces of plant or artificial plant as claim 15, wherein, the display module is a liquid crystal display.

21. The apparatus for printing images on surfaces of plant or artificial plant as claim 15, wherein, the communication module is a wired network card, a wireless network card, or a modem.

22. The apparatus for printing images on surfaces of plant or artificial plant as claim 15, wherein, connecting interface for movable memorizer is disposed on the housing and is connected with the computer device so as to connect and read the movable memorizer provided by the user.

23. The apparatus for printing images on surfaces of plant or artificial plant as claim 22, wherein, the connecting interface for movable memorizer is a USB interface, IEEE 1394 interface, IrDA infrared interface or RS-232/485 Serial Bus interface.

24. The apparatus for printing images on surfaces of plant or artificial plant as claim 23, wherein, the movable memorizer is CF card, SM card, memory rod, movable hard disk, U-disk, CD-ROM, ZIP driver or any other movable data read and memory device.

25. The apparatus for printing images on surfaces of plant or artificial plant as claim 1, 2 or 15, wherein, the printing unit is an ink jet printing unit.

26. The apparatus for printing images on surfaces of plant or artificial plant as claim 1, 2 or 15, being used to print images on surfaces of flower, artificial flower, leaf or fruit.

\* \* \* \* \*